US010235425B2

(12) United States Patent
Malik et al.

(10) Patent No.: US 10,235,425 B2
(45) Date of Patent: Mar. 19, 2019

(54) ENTITY FINGERPRINTS

(71) Applicant: Thomson Reuters Global Resources Unlimited Company, Baar (CH)

(72) Inventors: Hassan Malik, Monmouth Junction, NJ (US); Mans Olof-Ors, Luzern (CH); Ian MacGillivray, Astoria, NY (US); Christy Hatch, Thalwil (CH)

(73) Assignee: Thomson Reuters Global Resources Unlimited Company, Baar (CH)

( * ) Notice: Subject to any disclaimer, the term of this patent is extended or adjusted under 35 U.S.C. 154(b) by 11 days.

(21) Appl. No.: 15/077,713

(22) Filed: Mar. 22, 2016

(65) Prior Publication Data
US 2016/0314126 A1 Oct. 27, 2016

Related U.S. Application Data

(63) Continuation of application No. 13/213,324, filed on Aug. 19, 2011, now Pat. No. 9,292,545, which is a (Continued)

(51) Int. Cl.
*G06F 17/30* (2006.01)
*G06F 17/27* (2006.01)

(52) U.S. Cl.
CPC ...... *G06F 17/3053* (2013.01); *G06F 17/2785* (2013.01); *G06F 17/30292* (2013.01); (Continued)

(58) Field of Classification Search
CPC ........... G06F 17/30958; G06F 17/2785; G06F 17/30734
(Continued)

(56) References Cited

U.S. PATENT DOCUMENTS 7,672,865 B2 * 3/2010 Kumar ................... G06Q 10/04
705/7.29
7,672,875 B2 * 3/2010 Keohane .............. G06Q 20/387
705/26.62
(Continued)

OTHER PUBLICATIONS

Cooper J W et al (herein after "Cooper") "Detecting Similar Documents Using Salient Terms", 2004, pp. 1-6.*

*Primary Examiner* — Marcin R Filipczyk
(74) *Attorney, Agent, or Firm* — Duncan Galloway Egan Greenwald, PLLC; Kevin T. Duncan

(57) ABSTRACT

Systems and techniques for exploring relationships among entities are disclosed. The systems and techniques provide an entity-based information analysis and content aggregation platform that uses heterogeneous data sources to construct and maintain an ecosystem around tangible and logical entities. Entities are represented as vertices in a directed graph, and edges are generated using entity co-occurrences in unstructured documents and supervised information from structured data sources. Significance scores for the edges are computed using a method that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

11 Claims, 11 Drawing Sheets

Related U.S. Application Data continuation of application No. 13/107,665, filed on May 13, 2011, now Pat. No. 9,495,635, application No. 15/077,713, which is a continuation of application No. 14/834,317, filed on Aug. 24, 2015, now abandoned.

(60) Provisional application No. 61/445,236, filed on Feb. 22, 2011, provisional application No. 61/486,098, filed on May 13, 2011, provisional application No. 61/519,592, filed on May 25, 2011.

(52) U.S. Cl.
CPC .. *G06F 17/30734* (2013.01); *G06F 17/30867* (2013.01); *G06F 17/30958* (2013.01)

(58) Field of Classification Search
USPC .................................................. 707/752, 957
See application file for complete search history.

(56) References Cited

U.S. PATENT DOCUMENTS

| | | | |
|---|---|---|---|
| 9,436,760 B1* | 9/2016 | Tacchi | G06F 17/30684 |
| 2006/0129415 A1* | 6/2006 | Thukral | G06Q 10/087 |
| | | | 705/28 |
| 2011/0234594 A1* | 9/2011 | Charles | G06K 9/6224 |
| | | | 345/440 |

\* cited by examiner

ENTITY FINGERPRINTS

CROSS-REFERENCE TO RELATED APPLICATION

This application is a continuation of and claims benefit of priority to U.S. patent application Ser. No. 14/834,317, filed Aug. 24, 2015, entitled 'Entity Fingerprints', and to U.S. patent application Ser. No. 13/213,324, filed Aug. 19, 2011, entitled 'Entity Fingerprints', issued as U.S. Pat. No. 9,292,545 on Mar. 22, 2016, which claims the benefit of priority to U.S. Provisional Application No. 61/445,236 filed Feb. 22, 2011 entitled 'Information Processing and Visualization Methods and Systems', U.S. Provisional Application No. 61/486,098 filed May 13, 2011 entitled 'Entity-Based Information Analysis', U.S. Provisional Application No. 61/519,592 filed May 25, 2011, entitled 'Entity-Based Information Analysis', and U.S. patent application Ser. No. 13/107,665 filed May 13, 2011, entitled 'Association Significance', issued as U.S. Pat. No. 9,495,635 on Nov. 15, 2016, the contents of which are all incorporated herein in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2011, Thomson Reuters.

TECHNICAL FIELD

This disclosure relates to entity fingerprints, and more particularly to systems and techniques for computing and analyzing entity fingerprints.

BACKGROUND

Entity-centric models are traditionally built with strong reference to structured content: a database of people's personal details or of geographical information, for example. Representations of these entities are then simply a call-back to the structured content that was used to generate them, and comparisons between entities are simply comparisons of the various attributes in the database.

However, there exists a large amount of other interesting information relating to an entity in unstructured content (such as free-text data; for example a news story, a blog, or a press release) where that entity is mentioned. Further, information regarding the entities most closely related to a given entity can also be seen as an interesting property of that given entity.

As an example, consider Egypt—a country whose landmass, GBP, head of state, prime imports (in this case, wheat) and other such attributes are well known and available in structured data sets. By perusing free-text documents either published by Egyptian authorities, or documents that mention Egypt, further attributes may be discovered, such as Egypt's recent connection with Arabic states' civil unrest. Further, consider two companies that both depend on the price of wheat, but that are not directly related to one another: their common connection to Egypt creates a dependency between the two companies that may only be inferred through understanding their connections.

Accordingly, there exists a need for systems and techniques that address the need to represent entities by the unstructured content surrounding them, and information regarding the entities to which they are connected; and the corollary need to perform meaningful comparison between entities that may have no direct connection.

SUMMARY

Systems and techniques for exploring relationships among entities are disclosed. The systems and techniques provide an entity-based information analysis and content aggregation platform that uses heterogeneous data sources to construct and maintain an ecosystem around tangible and logical entities such as, but not limited to, organizations, people, products, industries, geographies, commodities, financial indicators, economic indicators, events, topics, subject codes, unique identifiers, social tags, industry terms, general terms, metadata elements, classification codes, and combinations thereof.

Entities are represented as vertices in a directed graph, and edges are generated using entity co-occurrences in unstructured documents and supervised information from structured data sources. Significance scores for the edges are computed using a technique that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

Various aspects of the invention relate to computing and analyzing entity fingerprints.

For example, according to one aspect, a method of analyzing an entity includes identifying a first entity from a plurality of entities, each of the plurality of entities associated with an entity fingerprint comprising at least one assigned attribute, comparing the entity fingerprint associated with the first entity to each of the entity fingerprints associated with the plurality of entities, and identifying at least one similar entity to the first entity from the plurality of entities based on the fingerprint comparisons. The method also includes generating a signal associated with the at least one identified similar entity and the first entity, and transmitting the signal.

In one embodiment, identifying the first entity comprises receiving a unique identifier associated with the first entity. The at least one assigned attribute associated with each entity fingerprint is based on a relevancy of the assigned attribute to the associated entity over a particular time interval. The assigned attribute may also be associated with a weight value indicating a relevancy of the assigned attribute to the associated entity as compared to other assigned attributes of the entity.

In one embodiment, for example, the method further includes ranking a plurality of similar entities in order of similarity to the first entity, generating a second signal associated with the ranking; and transmitting the second signal in response to a request. The method may also include providing a graphical user interface for viewing at least one attribute of the entity fingerprint, at least one attribute of at least one similar entity, at least one document related to the first entity, at least one document related to the first entity and the at least one similar entity, or combination thereof.

In one embodiment, the method further includes comparing entity fingerprints by computing a first weighted value for each unique attribute-type associated with the first entity by applying an aggregate function to attribute weights associated with attributes corresponding to each unique attribute-type of the first entity, computing a second weighted value for each unique attribute-type associated with the at least one similar entity by applying the aggregate function to attribute weights associated with attributes corresponding to each unique attribute type of the similar entity, and normalizing the attributes associated with each attribute-type of the first entity using the computed first weighted value and of the second entity using the computed second weighted value. A similarity score is then computed for the first and second fingerprints by applying a similarity function to the normalized attributes of the first entity and the similar entity.

In one embodiment, the aggregate function may be, but is not limited to an average function, a minimum function, a maximum function, and the like, and the similarity function may be, but is not limited to a cosine similarity, a Euclidean distance, a Manhattan distance, and the like.

In another aspect, a method of computing an entity fingerprint includes reading data representative of a set of attributes associated with an entity for which an entity fingerprint is desired, and processing the data in accordance with at least one fingerprint extraction algorithm. The fingerprint extraction algorithm computing the entity fingerprint by representing a plurality of entities including the entity as vertices of a directed graph, generating at least one edge of the directed graph using entity co-occurrences in a set of unstructured documents and structured information sources, and summarizing the set of attributes associated with the entity for which the entity fingerprint is desired using the structured information sources and an entity neighborhood of the directed graph.

In one embodiment, processing the data further includes initializing a data structure for association with the entity, the data structure including at least one attribute identifier, associated attribute-type identifier, associated attribute value, and associated attribute weight, comparing the entity with a set of pre-defined entities, each of the pre-defined entities optionally associated with an attribute identifier, attribute-type identifier, and attribute value, and importing values for the data structure based on the comparison.

The method also includes identifying information sources for association with the data structure from the set of structured information sources. Each of the set of structured information sources is optionally associated with an attribute identifier, an attribute-type identifier, an attribute value, and an information-source identifier, importing values for the data structure based on the identification of the information sources comprising information associated with the entity, identifying vertices of the directed graph that connect to the entity and comprise the entity neighborhood. Values are imported into the data structure based on at least one of the vertices and set of edges of the directed graph that connect to the entity and comprise the entity neighborhood.

The method further includes identifying documents for association with the entity based on metadata associated with each document of a set of documents, importing values for the data structure based on the identified documents, and associating the data structure with the entity.

In one embodiment, for example, the method further includes storing a reference to each of the identified documents in at least one of the vertices and the set of edges of the directed graph. In one embodiment, the at least one associated attribute is determined from the directed graph and the at least one associated attribute weight is determined from a set of pre-defined weights. Each of the set of pre-defined weights includes a weight value and at least one of an information-source identifier, an attribute-type identifier, an obtained-from-neighborhood identifier and a validated identifier. In yet another embodiment, each edge of the directed graph optionally includes an attribute identifier, an attribute-type identifier, and an attribute value.

In one embodiment, the method includes comparing a significant score attribute associated with an edge of the directed graph to a user-defined threshold value, and importing values for the data structure based on the comparison. The method may also include comparing the metadata associated with each document of the set of documents to an entity identifier associated with the entity, and importing values for the data structure based on the comparison.

In one embodiment, the method may include comparing metadata associated with each document of the set of documents to user-defined criteria, the user-defined criteria identifying at least one peer entity to the entity and not including the entity, and importing values for the data structure based on the comparison. The method may also include, for example, ranking one of entities and metadata optionally associated with each document of the set of documents for each attribute type associated therewith, and selecting a subset of documents for association with the data structure based on the ranking.

Systems, methods, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF THE DRAWINGS

FIGS. 7-8 show example matrix frames of the graphical user interface shown in FIG. 5.

Like reference symbols in the various drawings indicate like elements.

DETAILED DESCRIPTION

A novel entity-based information analysis and content aggregation system that uses heterogeneous data sources to construct and model tangible and logical entities is disclosed. The tangible and logical entities may include, but are not limited to, organizations, people, products, industries, geographies, commodities, financial indicators, economic indicators, events, topics, subject codes, unique identifiers, social tags, industry terms, general terms, metadata elements, classification codes, technologies, facilities, media, and combinations thereof.

In one embodiment, entities are represented as vertices in a directed graph, and edges of the directed graph are generated using entity co-occurrences in unstructured documents and structured information available from structured data sources. Vertices and edges of the directed graph may include properties and references to relevant documents, and a single edge of the graph may represent multiple types of relationships between entities. In one embodiment, some entities are validated by mapping each entity to a known entity from a structured data source (which may be human-maintained) while other entities are discovered and are solely obtained from unstructured data sources.

Significance scores for the edges of the graph are computed using a technique that combines supervised, unsupervised and temporal factors into a single score. The technique is disclosed in U.S. patent application Ser. No. 13/107,665 filed May 13, 2011, entitled 'Association Significance', the content of which is incorporated herein in its entirety.

Entity attributes derived from the structured content and the entity neighborhood in the graph are automatically summarized as an entity fingerprint. While the present invention is discussed in connection with a directed graph, it will be appreciated that the present invention is not limited to a directed graph implementation, and that other computer-implemented data structures capable of modeling entity relationships may be used with the present invention, such as a mixed graph and a multigraph. Further, in one embodiment, the system also includes an interactive user interface that provides exploratory access to the graph and supports common business use cases, such as determining entity similarity and comparing entities.

Figure 1:
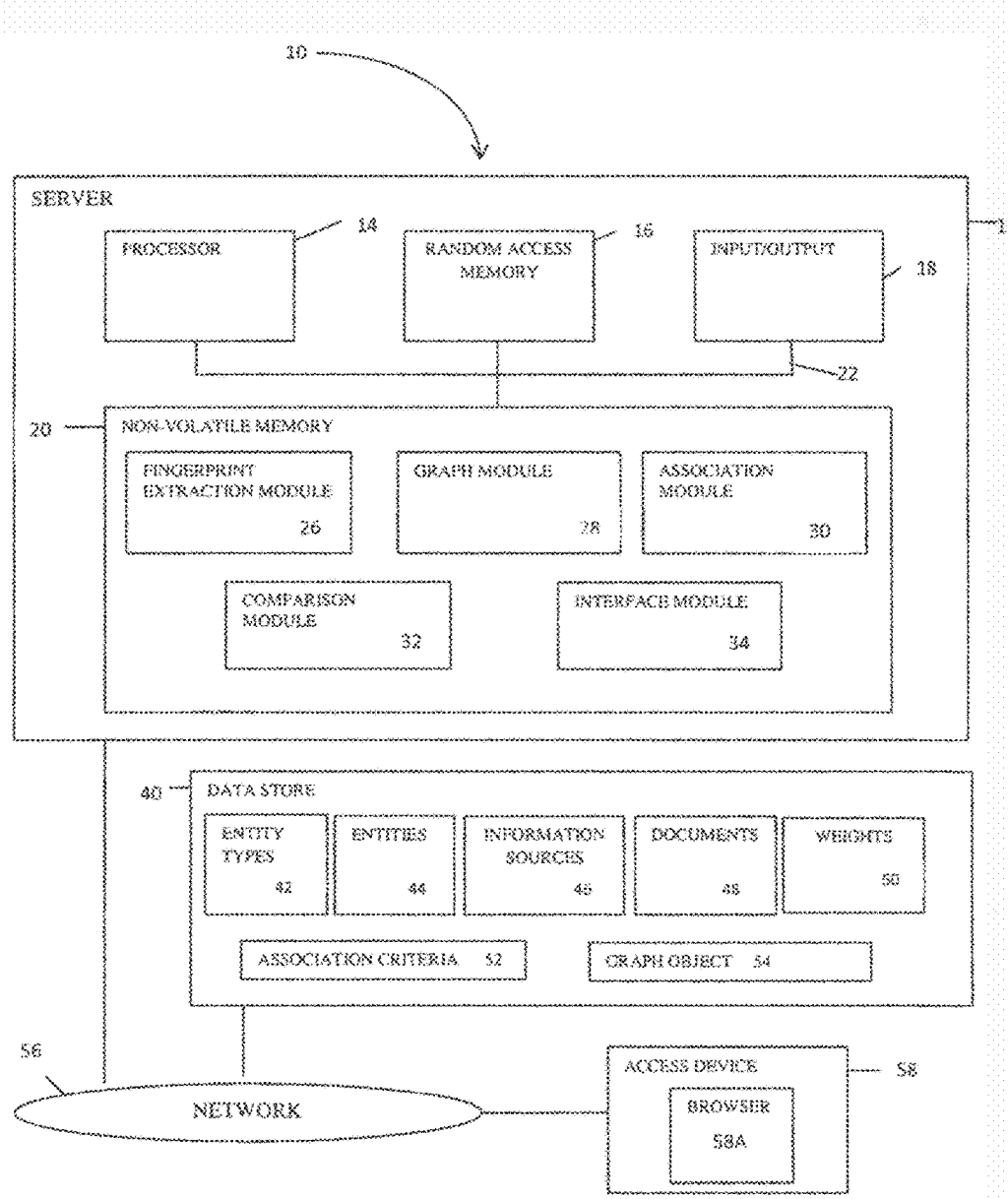
FIG. 1 is a schematic of an exemplary computer-based system for computing and comparing an entity fingerprint.

Turning now to FIG. 1, an example of a suitable computing system 10 within which embodiments of the present invention may be implemented is disclosed. The computing system 10 is only one example and is not intended to suggest any limitation as to the scope of use or functionality of the invention. Neither should the computing system 10 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

Various programming languages may be used to implement aspects of the present invention. In one embodiment, the programming language used is Java. The directed graph is loaded into a computer memory as a runtime Java object, and is persisted to a data store, such as a file system, as a serialized Java object. Information needed to generate the directed graph is stored in one or more structured data sources, such as a relational database. The following software libraries may be used to implement components of the system. These include, but are not limited to, Apache Lucene 3.0.1, text search engine library, and Apache XML Beans 2.4. Further, to generate Java objects from XML, schemas, the following may also be utilized: Jetty 6.01, a HTTP Web server and client; and a fast XML parser, such as VTD-XML.

As shown in the exemplary computer system 10 of FIG. 1, in one embodiment, the system 10 includes a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14.

The non-volatile memory 20 is configured to include a fingerprint extraction module 26 for computing and comparing entity fingerprints to one another. As used herein, the term 'fingerprint' refers to an abstract representation of an entity based on a number of its attributes and/or characteristics. Once a fingerprint is computed for an entity, the entity fingerprint may be compared to other entity fingerprints to understand similarities and differences that may exist. In one embodiment, computed entity fingerprints are used to generate feature vectors to be used in classification and clustering tasks.

Factors used by the fingerprint extraction module 26 to generate an entity fingerprint relate to the neighborhood of the entity determined from the directed graph. In one embodiment, the fingerprint extraction module 26 identifies neighborhood entities of a given type to which the entity is related and temporal aspects of these neighbors (e.g. one attribute being 'emerging neighbor'). Accordingly, entity fingerprints computed by the fingerprint-extraction module 26 may represent a point-in-time view of an entity. Structured information about the entity may also be incorporated into the fingerprint.

For example, considering an organizational entity, information such as the country in which the organization is incorporated and the industries in which the organization is known to operate may also be incorporated into the fingerprints. Further, in one embodiment, the fingerprint extraction module 26 uses entity to document relationships to add the top-k classification codes and top-k social tags (i.e., Wikipedia article titles related to a document) to organizational fingerprints. This is achieved by sorting each classification code or social tag with respect to the number of documents that include the organization and are also assigned with the classification code or social tag, and selecting the k most frequent results, where k is an integer value.

Accordingly, in one embodiment, each organizational fingerprint computed by the fingerprint extraction module 26 includes one or more of the following attribute groups: industry hierarchy; geography hierarchy; related industries; related geographies; related macroeconomic indicators; related commodities; related TRCS codes; related social tags; and related entities (in two groupings—those that are emerging and those that are stable.) An exemplary method of computing an entity fingerprint executed by the fingerprint-extraction module 26 is disclosed in connection with FIG. 2.

Referring to FIG. 1, a graph module 28 is included in the non-volatile memory 20 to construct the directed graph. In one embodiment, the graph module 28 initiates construction of the directed graph by selecting documents from available data sources and processing these documents. The processing of these documents includes extracting entities based on metadata associated with a document, and resolving any inconsistencies that may be detected with structured data sources. The graph module 28 then generates vertices of the directed graph based on the extracted entities and generates edges between the extracted entities. Once entities are extracted, the graph module 28 generates edges of the graph between resolved entities.

As shown in FIG. 1, an association module 30 also is provided in the non-volatile memory 20. The association module 30 computes a significance score for an association between entities, the significance score being an indication of the level of significance of one entity to another entity. In one embodiment, the association module 30 uses entity co-occurrences in unstructured documents to establish connections (e.g., edges) between entities. The association module 30 may assign a significance score to one or more edges of the directed graph, where higher values indicate stronger connections. As entity relationships may be represented using a directed graph, there exists two edges between each pair of connected entities, each of which may be assigned a different significance score by the association module 30. Advantageously, this allows the system 10 to model a common real-life situation where a given entity E1 may be very significant for a connected entity E2, but the connected entity E2 may not be equally significant for entity E1.

Figure 4:
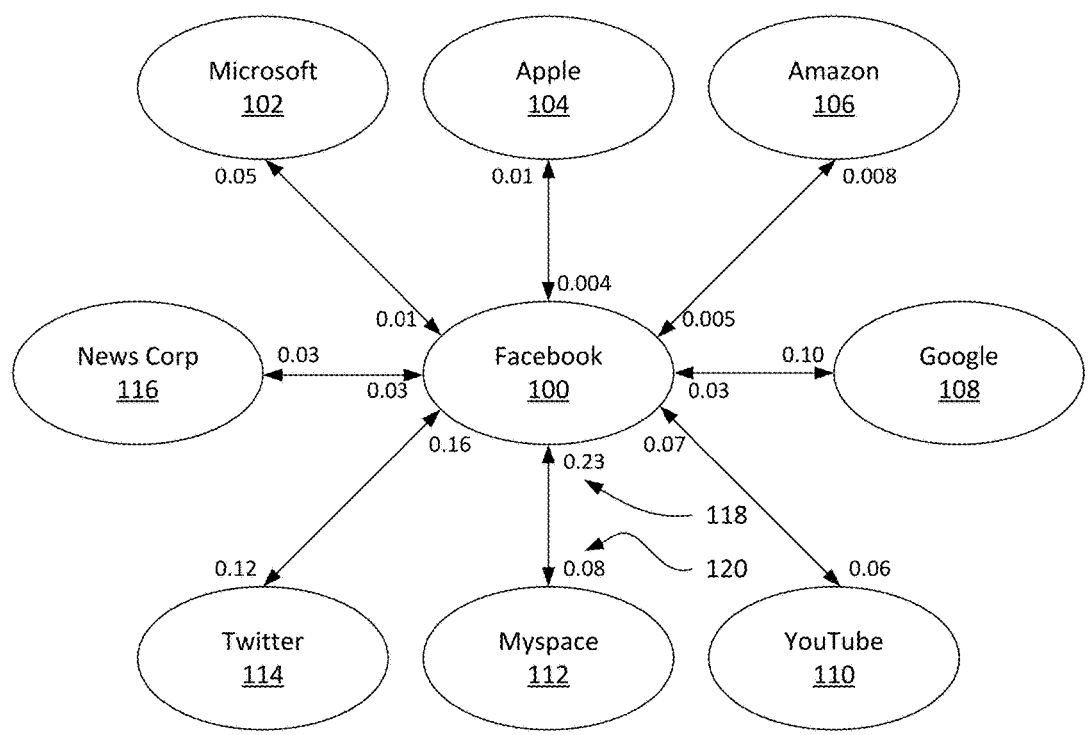
FIG. 4 is a schematic of an exemplary directed graph.
Figure 5:
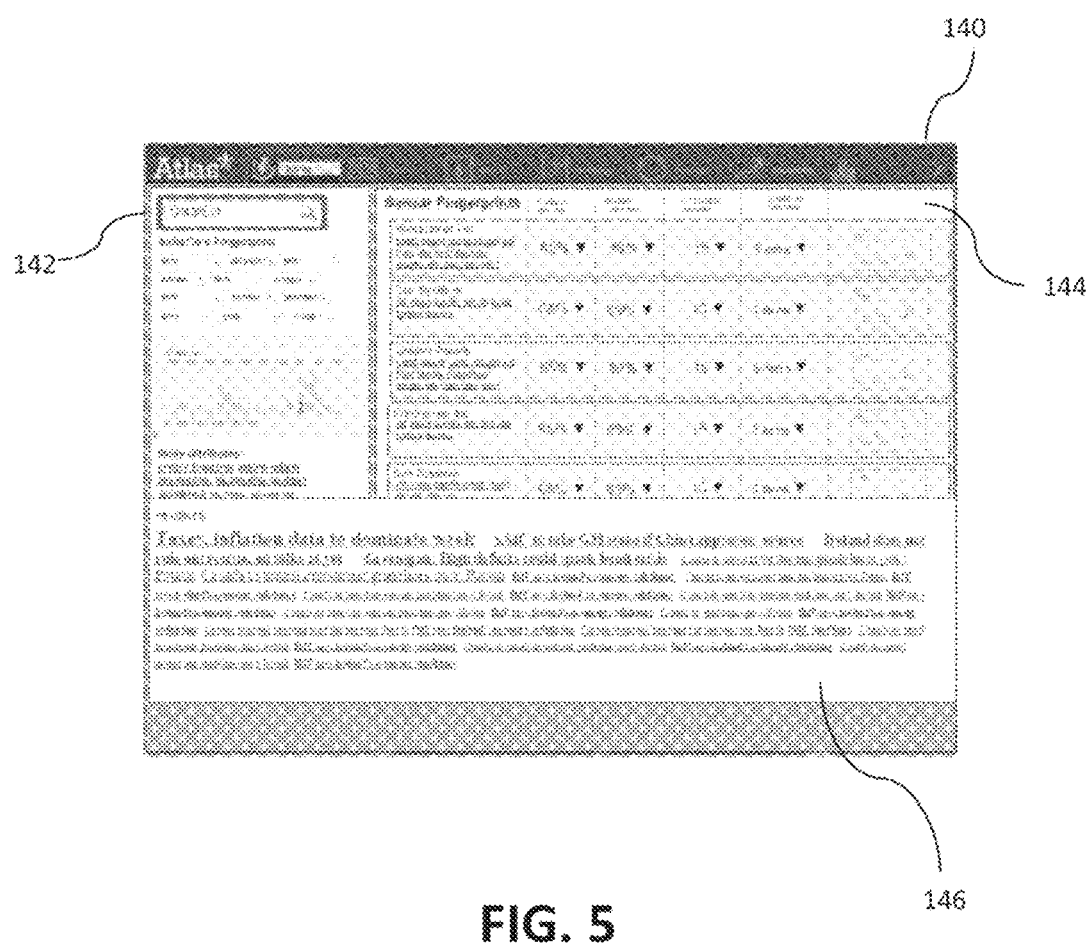
FIG. 5 illustrates an example graphical user interface for displaying an entity fingerprint.

An example of entity relationships between one organization, Facebook 100 and some of its entity neighbors is shown in connection with FIG. 4. The example significance scores illustrated in FIG. 4 indicate that Twitter 114 is more significant to Facebook 100, as indicated by a strength of 0.12, than Microsoft 102, indicated by a strength of 0.05, and both are more significant than Apple 104, indicated by a strength of 0.01. In contrast, Facebook 100 is important to Microsoft 102 but not equally significant, as indicated by strength of 0.01. As perceived by some market professionals, Microsoft 102 is a major shareholder and investor in Facebook 100, but is also involved in a variety of other business areas. The relationship between Facebook 100 and Google 108 exhibits a similar behavior. By contrast, as perceived by many market professionals, Facebook 100 is a major competitor to MySpace's 112 core business, making the most significant connection in FIG. 4 the MySpace→Facebook edge 118 indicated by a strength of 0.23, whereas MySpace's 112 actions appear less important to Facebook 100, which is clear from the fact that the connection in the opposite direction 120 is not of nearly the strength, namely 0.08.

Referring back to FIG. 1, the association module 30 computes significance scores using a variety of factors that capture different aspects of entity relationships. As noted previously, details of computing significance scores is discussed in U.S. patent application Ser. No. 13/107,665 filed May 13, 2011, entitled 'Association Significance', the contents of which is incorporated herein in its entirety.

In one embodiment, the association module 30 computes significance scores as a weighted average of multiple factors which include interestingness, recent interestingness, validation, common neighbors, industry overlap, geographic overlap, temporal significance, and element of surprise.

In one embodiment, the interestingness factor is computed by considering entities as two variables, populating a contingency-table with entity frequencies from all available documents, and then applying an interestingness measure to the contingency-table.

The recent interestingness factor is computed similar to the interestingness factor, but is computed only using documents that have been created and/or made available over a user-definable time interval. Advantageously, this factor enhances emerging relationships.

The validation factor is computed by assigning a value of one (1) if the relationship between a source and target entities was validated by a human expert (in available structured data). Otherwise, a value of zero (0) is assigned to the validation factor.

The common neighbors factor is computed as a percentage of the degree-1 neighbors of a source entity that also occur in the degree-1 neighborhood of the target entity.

The industry overlap factor is computed as a percentage of the industries in a source entity's neighborhood that also occur in the degree-1 neighborhood of the target entity.

The geography overlap factor is computed as a percentage of the geographies in source entity's neighborhood that also occur in the degree-1 neighborhood of the target entity.

The temporal significance factor is computed by comparing the recent interestingness value with an interestingness value computed from historic (non-recent) documents. The association module 30 assigns a value of one (1) to the factor if the recent interestingness value is greater than a threshold value, and assigns a value of zero (0) to the factor if the recent interestingness value is less than the threshold value. This factor rewards relationships that had gained strength in the recent time period and penalizes relationships that had lost strength.

The element of surprise factor is computed by assigning a value of one (1) if the source entity's neighborhood contains any new industries or geographies in the recent period that did not occur in the historic period, and the target entity shares at least one such industry or geography, otherwise the element of surprise factor is assigned a value of zero (0).

Additional details of computing significance scores utilized by the association module 30 are disclosed in co-pending U.S. patent application Ser. No. 13/107,665 filed May 13, 2011, entitled 'Association Significance', the content of which is incorporated herein in its entirety.

The comparison module 32 is provided and computes a similarity score between two fingerprints. In one embodiment, the similarity score is computed as a weighted linear combination of the cosine similarity scores of each attribute included in the fingerprints, where weights may be empirically selected by domain experts. This score represents how alike two entities are, rather than simply how connected they are in the graph. This information is of particular utility to investment bankers. A method of comparing entity fingerprints is discussed in connection with FIG. 3.

The non-volatile memory 20 also includes an interface module 34 that provides a graphical user interface for viewing none or more entity fingerprints. Additional details of each of the modules 26, 28, 30, 32 and 34 are discussed in further detail below.

The software modules 26-34 of the present invention may be implemented as a set of services that are accessible using Flash or HTML-based client applications. Requests and responses may be sent using either standard HTTP, XML over HTTP, or be batched using Google's Protocol Buffers. Data partitioning also may be used to allow vertical and horizontal scalability, i.e., the directed graph may be distributed between multiple nodes in a de-centralized peer network, each of which owns a subset of documents or entities. Protocol Buffers may also be used for inter-node communication to service user requests in the distributed graph.

As shown in FIG. 1, a network 56 is provided that can include various devices such as routers, server, and switching elements connected in an Intranet, Extranet or Internet configuration. In one embodiment, the network 56 uses wired communications to transfer information between an access device 58, the server device 12, and a data store 40. In another embodiment, the network 56 employs wireless communication protocols to transfer information between the access device 58, the server device 12, and the data store 40. In yet other embodiments, the network 56 employs a combination of wired and wireless technologies to transfer information between the access device 58, the server device 12, and the data store 40.

The access device 58 can include a personal computer, laptop computer, or other type of electronic device, such as a cellular phone or Personal Digital Assistant (PDA), In one embodiment, for example, the access device 58 is coupled to 110 devices (not shown) that include a keyboard in combination with a pointing device such as a mouse for sending web page requests to the server device 12. Preferably, memory of the access device 58 is configured to include a web browser 58A that is used to request and receive information from the server 12. Although only one access device 58 is shown in FIG. 1, the system 10 can support multiple access devices.

The data store 40 is a repository that maintains and stores information utilized by the before-mentioned modules 26-34. In one embodiment, the data store 40 is a relational database. In another embodiment, the data store 40 is a directory server, such as a Lightweight Directory Access Protocol ('LDAP'). In yet another embodiment, the data store 40 is an area of non-volatile memory 20 of the server 12.

In one embodiment, as shown in the FIG. 1 example, the data store 40 includes a set of entity types 42. As used herein, the words 'set' and 'sets' refer to anything from a null set to a multiple element set. Each member of the set of entity types 42 represents a type of tangible or logical entity that is pre-defined in the system. The set of entity types 42 may include, but are not limited to, the following classes of entities: organizations, people, products, industries, geographies, commodities, financial indicators, economic indicators, events, topics, subject codes, unique identifiers, social tags, industry terms, general terms, metadata elements, classification codes, and combinations thereof.

A set of pre-defined entities 44 are also provided that are used to identify similar entities and to determine attributes of entities. Each member of the set of pre-defined entities represents a specific tangible or logical entity and is associated with zero (0), one (1), or many members of the set of entity types 42. In one embodiment, each member of the set of pre-defined entities 44 may be associated with an attribute identifier, an attribute-type identifier, and an attribute value (i.e., a triplet). For example, if one of the pre-defined entities represents a company, such as 'Thomson Reuters', an attribute-type identifier may be 'Corporate headquarters', an attribute identifier may be 'City", and an attribute value may be "New York".

In one embodiment, the data store 40 includes a set of information sources 46. The set of information sources 46 are structured data sources in which each member is associated with one (1) or more attribute identifiers, attribute-type identifiers, attribute values, and information source identifiers (i.e., a quadruple) for each member of the set of pre-defined entities 44.

The data store 40 also includes a set of documents 48. Each of the set of documents 48 is optionally associated with a set of document quadruples comprising an entity identifier (e), an attribute identifier, an attribute-type identifier, and an attribute value. The entity identifier (e) relates to at least one member of the set of pre-defined entities 44. In one embodiment, at least one document of the set of documents is associated with metadata that identifies one or more entities.

A set of weights 50 also is provided in the data store 40 and is used to compute similarities between fingerprint attributes. Each member of the set of weights 50 is associated with a numerical value and one or more information source identifier, attribute-type identifier, and binary variables indicating whether the numerical weight value is obtained from the directed graph and whether the numerical weight value has been validated by a human.

A set of association criteria 52 is provided that comprises contingency tables used by the association module 30 to compute a significance score for an identified relationship between entities. In one embodiment, the contingency tables are associated with a set of interestingness measures that are used by the association module 30 to compute the significance score. In one embodiment, the data store 40 also includes a graph object 54. The graph object 54 is a serialized Java object that has been persisted and represents the directed graph. Information needed to generate the directed graph is stored in one or more data sources stored in the data store 40. Additional details concerning information included in the data store 40 are discussed in greater detail below.

Although the data store 40 shown in FIG. 1 is connected to the network 56, it will be appreciated by one skilled in the art that the data store 40 and/or any of the information shown therein, can be distributed across various servers and be accessible to the server 12 over the network 56, be coupled directly to the server 12, or be configured in an area of non-volatile memory 20 of the server 12.

Further, it should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
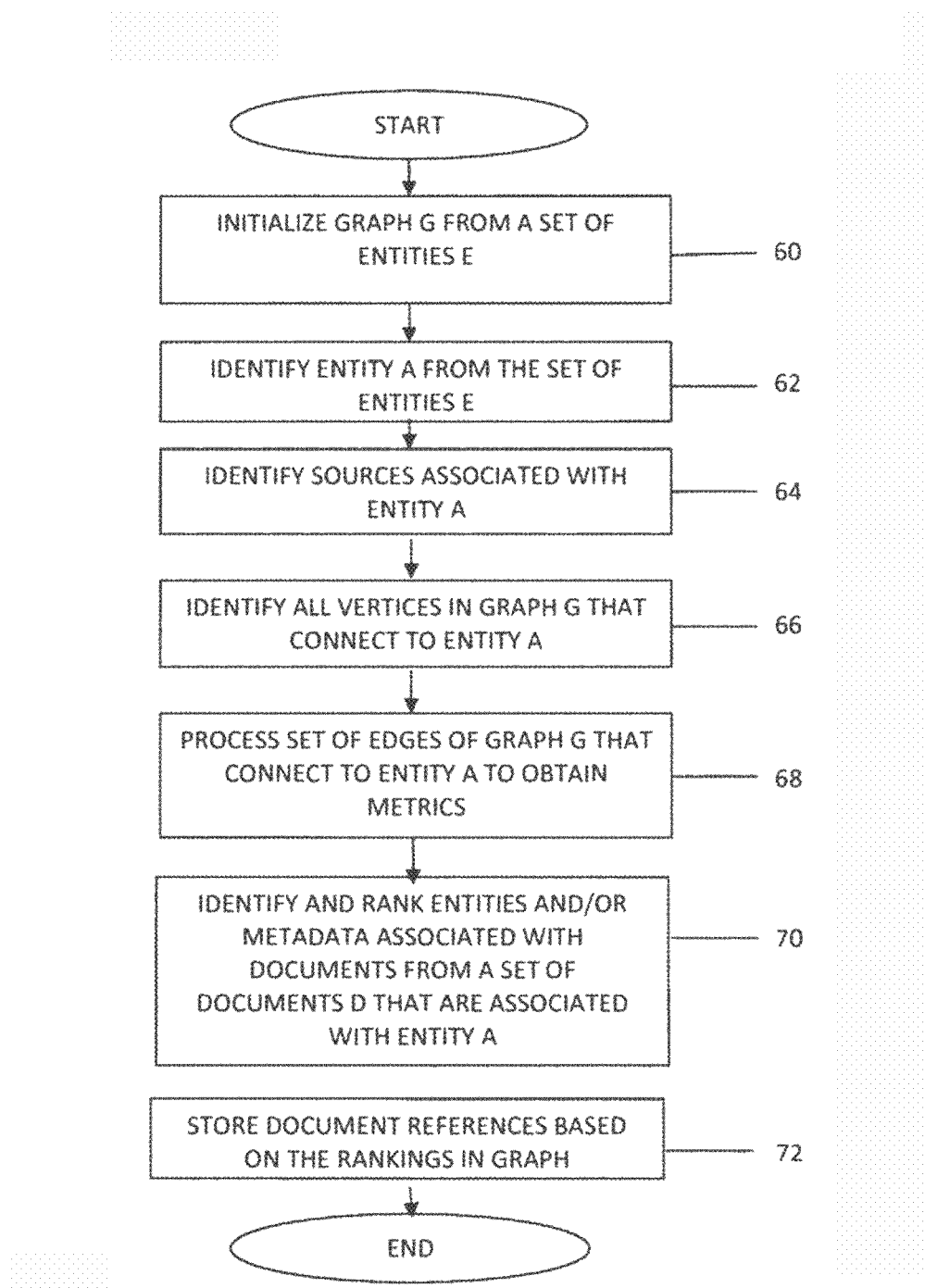
FIG. 2 illustrates an exemplary method for generating an entity fingerprint.

Turning now to FIG. 2, an example method for computing an entity fingerprint for an entity 'A' is disclosed. As shown in the FIG. 2 example, at step 60, in response to receiving a request, the fingerprint extraction module 26 initializes a fingerprint 'F' for the entity 'A'. The fingerprint A comprises a data structure having at least one attribute identifier that identifies an entity characteristic, an attribute-type identifier that identifies a category for the entity characteristic, an attribute value for the attribute identifier, and an attribute weight that identifies a level of significance of the characteristic, hereinafter referred to collectively as a 'quadruple'. Upon initialization, the data structure comprises zero and/or null values.

Next, at step 62, the fingerprint extraction module 26 compares entity A with each member of the set of pre-defined entities 44. Based on the comparison, the fingerprint extraction module 26 adds a quadruple to fingerprint F for each identified member in the set of pre-defined entities 44 by importing values associated with identified entities into the data structure. The fingerprint extraction module 26 then determines the attribute weight of the quadruple from the weights data store 50 using the attribute-type identifier and the information source identifier from the set of information sources 46.

Next, at step 64, the fingerprint extraction module 26 identifies all members of the set of information sources 46 that comprise a quadruple for entity A. In one embodiment, the fingerprint extraction module 26 adds a quadruple to the fingerprint F for each identified member of the set of information sources 46 by importing attribute identifiers, attribute-type identifiers, attribute values, and information source identifiers directly from the set of information sources 46. The fingerprint extraction module 26 then determines the attribute weight from the weight data store 50 using the attribute-type identifier and an information source identifier associated with each identified member of the set of information sources 46.

The fingerprint extraction module 26, at step 66, then identifies all vertices representing entities from the directed graph that connect to entity A. In one embodiment, the fingerprint extraction module 26 adds a quadruple to fingerprint F for each vertex that meets user-defined criteria. For example, the user-defined criteria may be used to identify vertices connected via an edge that have a significance or relevance score attribute that meets a user-defined threshold value. The user-defined criteria may also be used to identify vertices associated with a user-defined attribute-type identifier or attribute identifier, and/or edges that are associated with a user-defined attribute-type identifier or attribute identifier. The fingerprint extraction module 26 then imports values for the fingerprint A from each identified vertex (e.g., attribute identifiers, attribute-type identifiers, and attribute values associated with each vertex) and determines attribute weights from the weights data store 50 using the attribute-type, and binary values indicating that the attribute is derived from the directed graph and not the set of information sources 46.

Next, at step 68, the fingerprint extraction module 26 processes a set of edges that directly connect to entity A to obtain attribute metrics of connected entities. In one embodiment, for each connected vertex, the fingerprint extraction module 26 adds a quadruple to fingerprint F using a calculated attribute identifier and value that is based on an identified attribute-type. The fingerprint extraction module 26 then determines an attribute weight for the calculated attribute from the weights data store 50 using the attribute-type, and binary values indicating that the attribute is derived from the directed graph and not the set of information sources 46. The fingerprint extraction module 26 imports the calculated attribute identifier, attribute-type, attribute value, and attribute weight into the fingerprint F data structure.

The fingerprint extraction module 26, at step 70, then identifies and ranks entities and/or metadata associated with documents from the set of documents 48 where the entity A is noted. As described previously, at least one document of the set of documents 48 may include metadata tags and/or entity information that identifies one or more entities. In one embodiment, for all entities except entity A identified in a document, the fingerprint extraction module 26 counts the number of documents that exclude entity A and adds a quadruple to fingerprint F for each document, selecting entities that meet a user-defined criteria, such as a threshold value indicative of a minimum number of documents that contain the selected entities. The fingerprint extraction module 26 imports values for the fingerprint data structure from identified documents based on the ranking of metadata tags and/or entity information, and at step 72, stores references to the identified documents in the directed graph (e.g., vertices and edges of the directed graph) based on the ranking.

Figure 3:
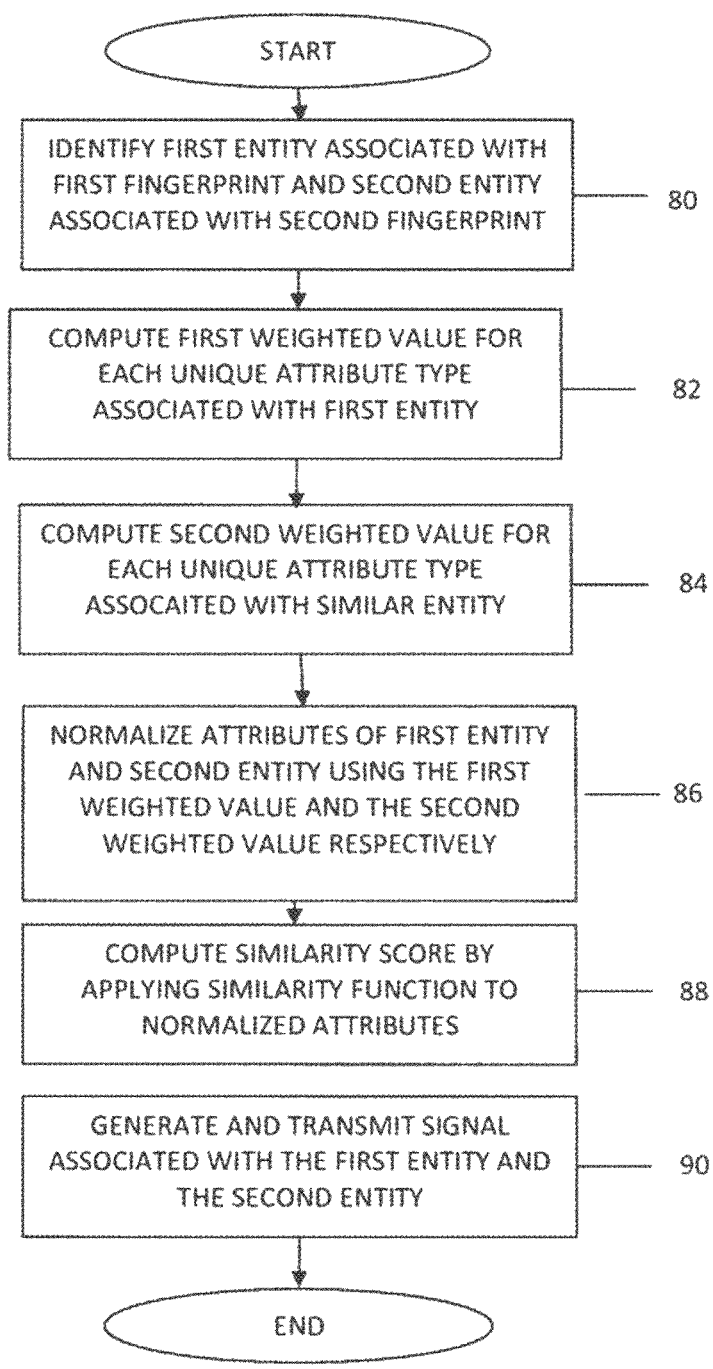
FIG. 3 illustrates an exemplary method for comparing entity fingerprints.

Turning now to FIG. 3, an exemplary method of comparing entity fingerprints executed by the comparison module 32 is disclosed. First, at step 80, the comparison module 32 identifies a first entity associated with a first fingerprint and a second entity associated with a second fingerprint. In one embodiment, the first entity and the second entity are initially identified by a user and received via a graphical user interface provided by the interface module 34 using unique identifiers associated with each entity.

Next, at step 82, the comparison module 32 computes a first weighted value for each unique attribute-type associated with the first entity. In one embodiment, the comparison module 32 applies an aggregation function, such as an average function, a minimum function, or maximum function, to attribute weights of attribute identifiers that are associated with the first entity. Next, at step 84, the comparison module 32 computes a second weighted value for each unique attribute-type associated with the second entity. Similar to computing the first weighted value, the comparison module 32 applies an aggregation function to attribute weights of attribute identifiers associated with the second entity.

Next, at step 86, the comparison module 32 normalizes attribute values of the first entity using the computed first weighted value of the first entity, and normalizes attribute values of the second entity using the computed second weighted value of the second entity. Each of these computed weighted values are equally distributed across each respective entity's attribute values. For example, assuming a computed weighted value of twenty (20) for an attribute-type TY and a number of attribute identifiers for the attribute-type TY of ten (10), the comparison module 32 assigns an attribute weight of two (2) (i.e., aggregated weight(20)/number of attributes(10)) to each attribute corresponding to the attribute-type TY.

Next, at step 88, the comparison module 32 computes a similarity score for the first and second entity fingerprints by applying similarity functions to corresponding normalized attributes of each fingerprint and aggregates the results. Example similarity functions that may be applied to corresponding normalized attributes include, but are not limited to, cosine similarity, Euclidean distance, Manhattan distance, and the like.

Lastly, at step 90, the comparison module 32 generates a signal associated with the first entity and the second entity and transmits the signal in response to a request.

Turning now to FIGS. 5-10 and referring collectively thereto, an example graphical user interface (GUI') 140 provided by the interface module 34 is shown. As shown in the FIG. 5 example, in one embodiment, the GUI 140 includes a query frame 142 for specifying an entity, a matrix frame 144 for listing similar entity fingerprints to the entity specified in the query frame 142, and a headline frame 146 for listing any news items and/or documents that may relate to the entity specified in the query frame 142.

Figure 6:
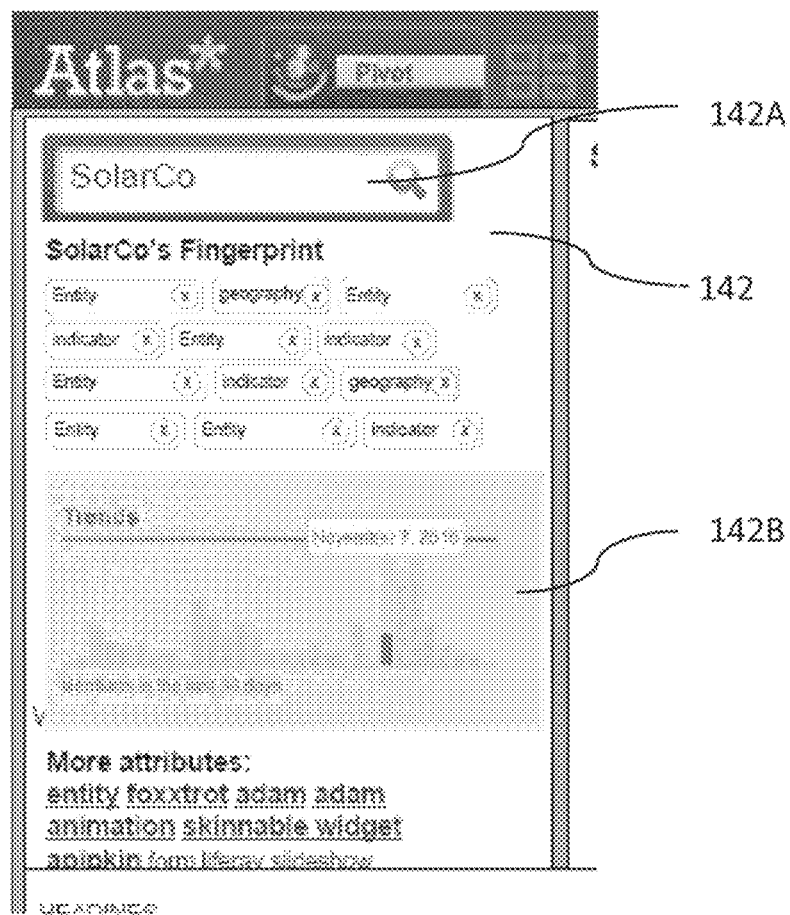
FIG. 6 illustrates an example query frame of the graphical user interface shown in FIG. 5.

Referring to FIG. 6, further details of the query frame 142 are disclosed. As shown in the FIG. 6 example, an input text field 142A is provided that allows a user to specify a unique entity identifier. The unique entity identifier may be, but is not limited to, a ticker symbol, entity code, entity name, or partial entity name. The unique entity identifier is associated with entities modeled in the system. In one embodiment, the input text field 142A is auto suggest enabled for entities of type 'Company'. Upon selecting a magnifying glass or pressing an enter key, the unique entity identifier is received by the fingerprint extraction module 26. The fingerprint extraction module 26 then formulates a query for the entity and returns the entity fingerprint and similar fingerprints for display in the query frame 142, the matrix frame 144, the headline frame 146. As described previously, in one embodiment, an entity fingerprint is a predefined set of characteristics/entities that reflect important aspects of the entity. For example, in the case of an entity of type 'Company', sector membership, related commodities and geographic information may be associated with the entity fingerprint.

In one embodiment, for example, a user is allowed to temporarily remove characteristics/attributes of a fingerprint associated with an entity. Such an action operates as a filter to remove the same criteria from search results displayed in the matrix frame 144 and the headline frame 146. For example if the user removes the entity 'Germany' from an entity fingerprint, any entity displayed in the matrix result frame 144 with the property Germany in its fingerprint is removed.

As shown in the FIG. 6 example, the query frame 142 is configured to include a trend line 142B for the selected query entity (i.e., the entity represented by the entity identifier in the input text field 142A). In one embodiment, the trend line 142B is displayed as a chart with a thirty (30) day history. Each day is represented as a bar and represents a number of documents mentioning the query entity.

Figures 7, 8:
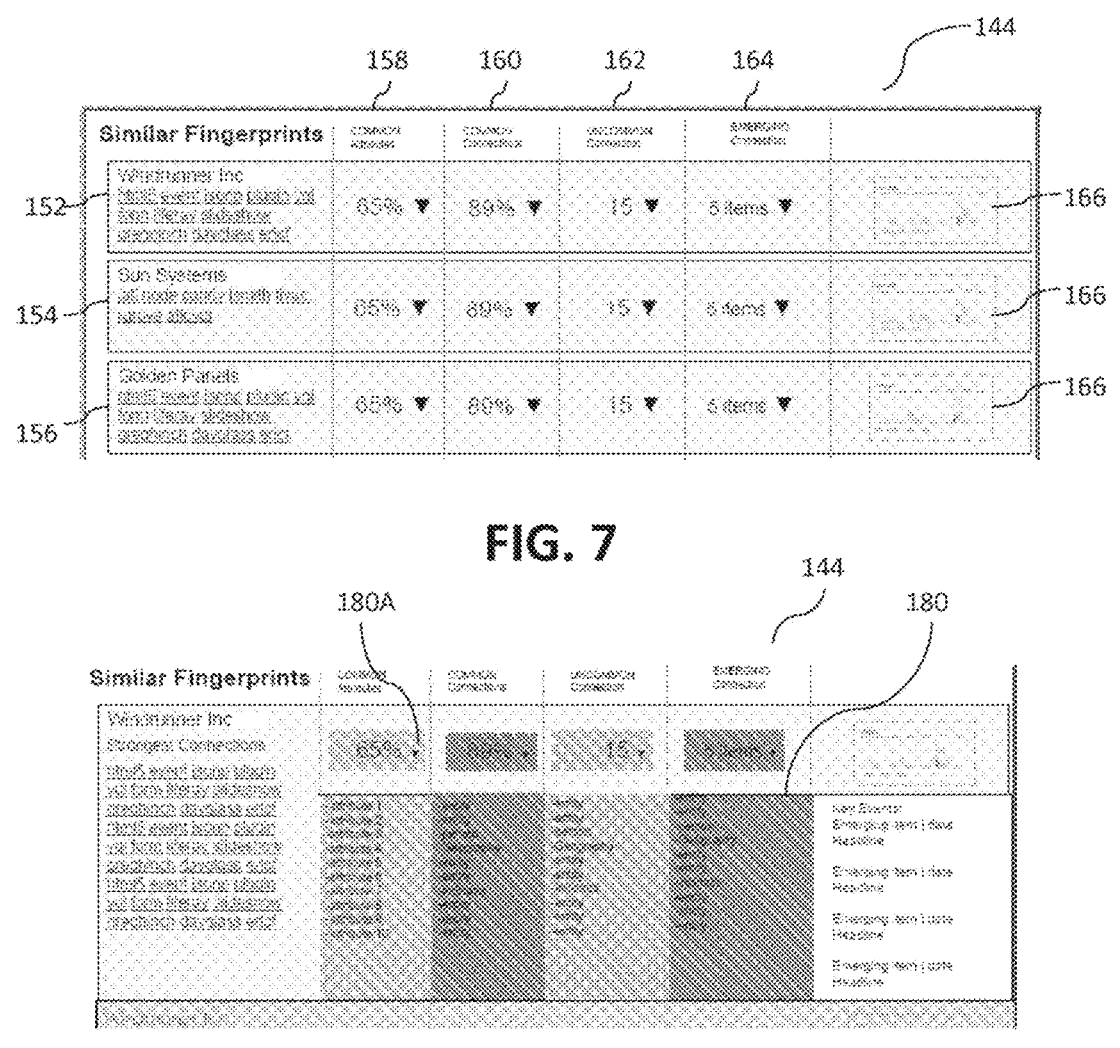

Turning now to FIG. 7, the matrix frame 144 displays entities that have been determined by the fingerprint extraction module 26 to have the most shared entities/attributes with the query entity. In one embodiment, the similar entities are ranked by the fingerprint extraction module 26 and then displayed in a list with the most similar entity to the query entity being displayed at the top of the list. In one embodiment, the list is provided with a scroll capability to display multiple similar entities. In another embodiment, each similar entity may be dragged and dropped to the input field 142A of the query frame 142. This operates to replace the original query entity with the dragged entity and update all frames 142, 144, 146 accordingly.

As shown in the FIG. 7 example, each identified similar entity 152, 154, 156 is displayed with its entity name, percentage of attributes in common with the query entity 158, percentage of shared connections with the query entity from the directed graph 160, a number of top connections not shared with the query entity 162, and whether there are any emerging or trending connections for the similar entity 164. In one embodiment, a selectable trend line 166 associated with each similar entity illustrates the number of documents noting the similar entity, per day, for a preset time interval (e.g., the last thirty (30) days).

Figure 9:
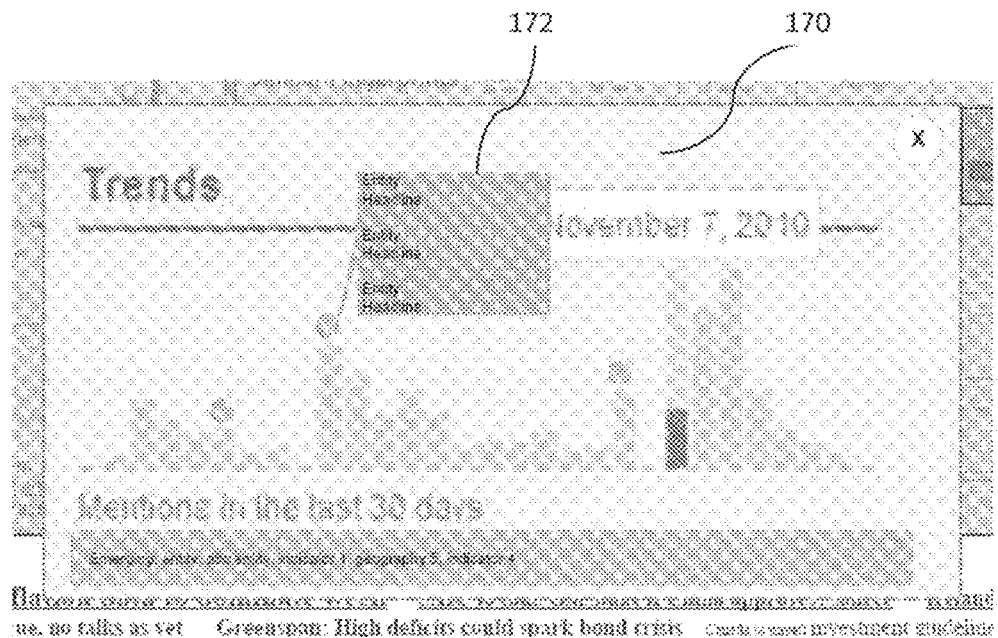
FIG. 9 illustrates a news overlay of the graphical user interface shown in FIG. 5.

Referring now to FIG. 9, upon selection of a trend line 166 from the matrix result frame 144, a large overlay 170 of the trend line 166 is displayed. The overlay allows a user to drill down to specific news events for the entity. As shown in the FIG. 9 example, upon moving a pointing device, such as a mouse, over any bar of the overlay 170 results in a call out 172 being displayed that includes individual headlines relating to the similar entity.

FIG. 8 illustrates the matrix frame 144 having a horizontal grid line 180. As shown in the FIG. 8 example, in one embodiment, a user is able expand the horizontal grid line 180 in the matrix frame 144 by clicking on an arrow 180A next to a value. As shown in the FIG. 8 example, this operates to push displayed results below the grid line 180 resulting in more detailed information on reasons entities have been found similar to each other being presented to the user.

Figure 10:
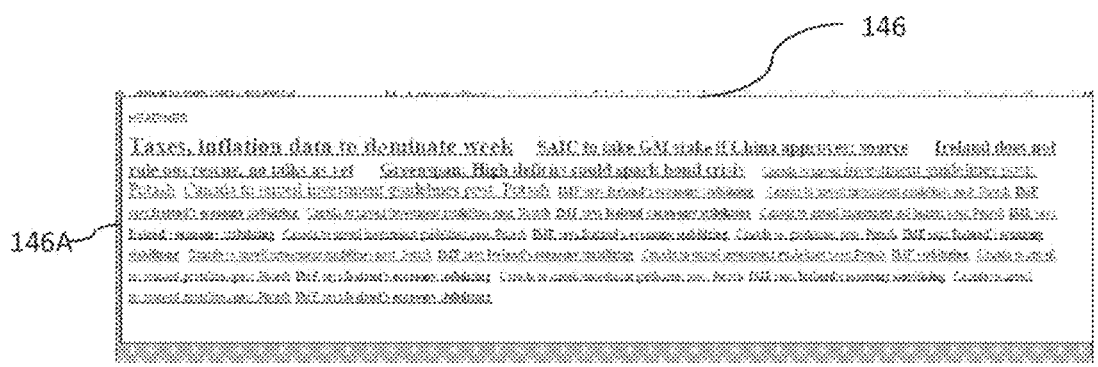
FIG. 10 illustrates a headline frame of the graphical user interface shown in FIG. 5.

Turning now to FIG. 10, in one embodiment, the headline frame 146 displays a selectable list 146A of the most important headlines/documents for the query entity, as well as all the similar entities displayed in the matrix frame 144, over a predefined time interval. In one embodiment, the selectable list 146A is sorted by time, with the most recent headline/document displayed at the top of the list. Upon moving a pointing device, such as a mouse, over a headline/document, a popup dialog box is displayed listing the headline, a date, and one or more entities the headline/document references.

Figure 11:
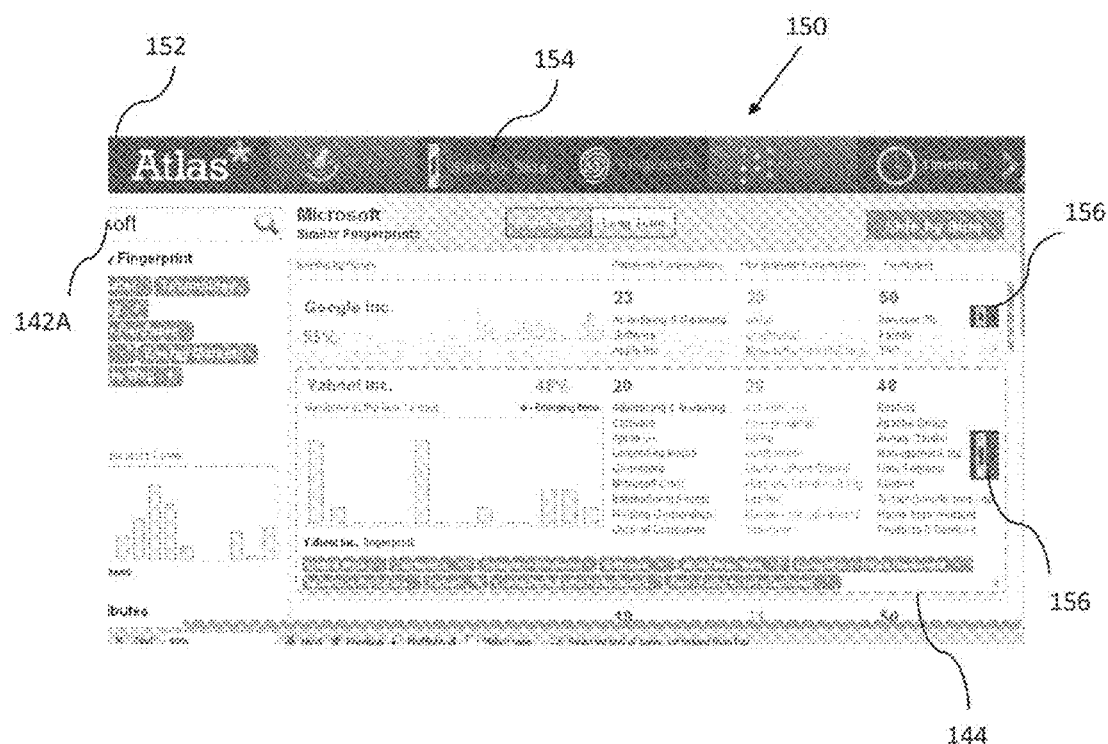
FIG. 11 illustrates an example entity fingerprint display.

Referring now to FIG. 11, an entity fingerprint display 150 is shown having a plurality of adjacent navigation options for accessing an adjacent view of entities. The adjacent view allows a user to view common and uncommon entities and concepts shared between two entities. As shown in the FIG. 11 example, in one embodiment, the adjacent view may be accessed via a push button 154 included in a top navigation menu 152 of the fingerprint display 150 and also via a navigation item 156 associated with each result item of the matrix frame 144.

Figure 12:
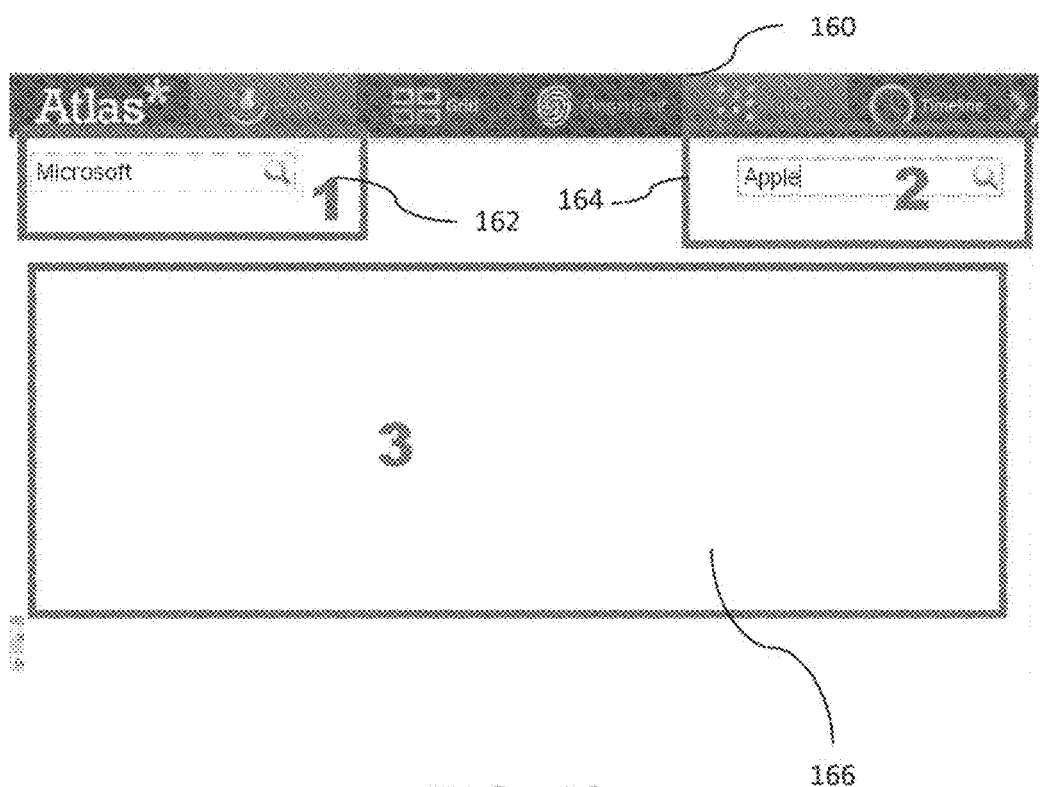
FIG. 12 illustrates a schematic side-by-side display.

FIG. 12 is a schematic of a side-by-side display 160. Referring now to both FIGS. 11 and 12, if the side-by-side display 160 is launched using the push button 154 of the top navigation menu 152, any query entity currently displayed in the input text field 142A of the fingerprint display 150 is passed to the side-by-side display 160. As shown in the FIG. 12 schematic, in one embodiment, the passed query entity is displayed on the left side (area 1) 162 of the side-by-side display 160. If the user has selected one of the result lines of the fingerprint display 150 in the matrix frame 144 (e.g., the entity 'Yahoo' in FIG. 11), the selected entity identifier is sent to the side-by-side display 160 and displayed on the right side (area 2) 164 of the side-by-side display. If the user has not selected any of the items in the matrix frame 144, the right side (area 2) 164 of the side-by-side display 160 remains unpopulated.

If the side-by-side display 160 is launched using a result line item of the matrix frame 144, the query entity displayed in the input text field 142A of the fingerprint display 150 is passed to the side-by-side display 160 and displayed on the left side (area 1) 162 of the side-by-side display 160. The selected result line item is passed to the side-by-side display and displayed on the right side (area 2) 164.

Result area 166 is used to display connection strengths between entities and is discussed in further detail below.

Figure 13:
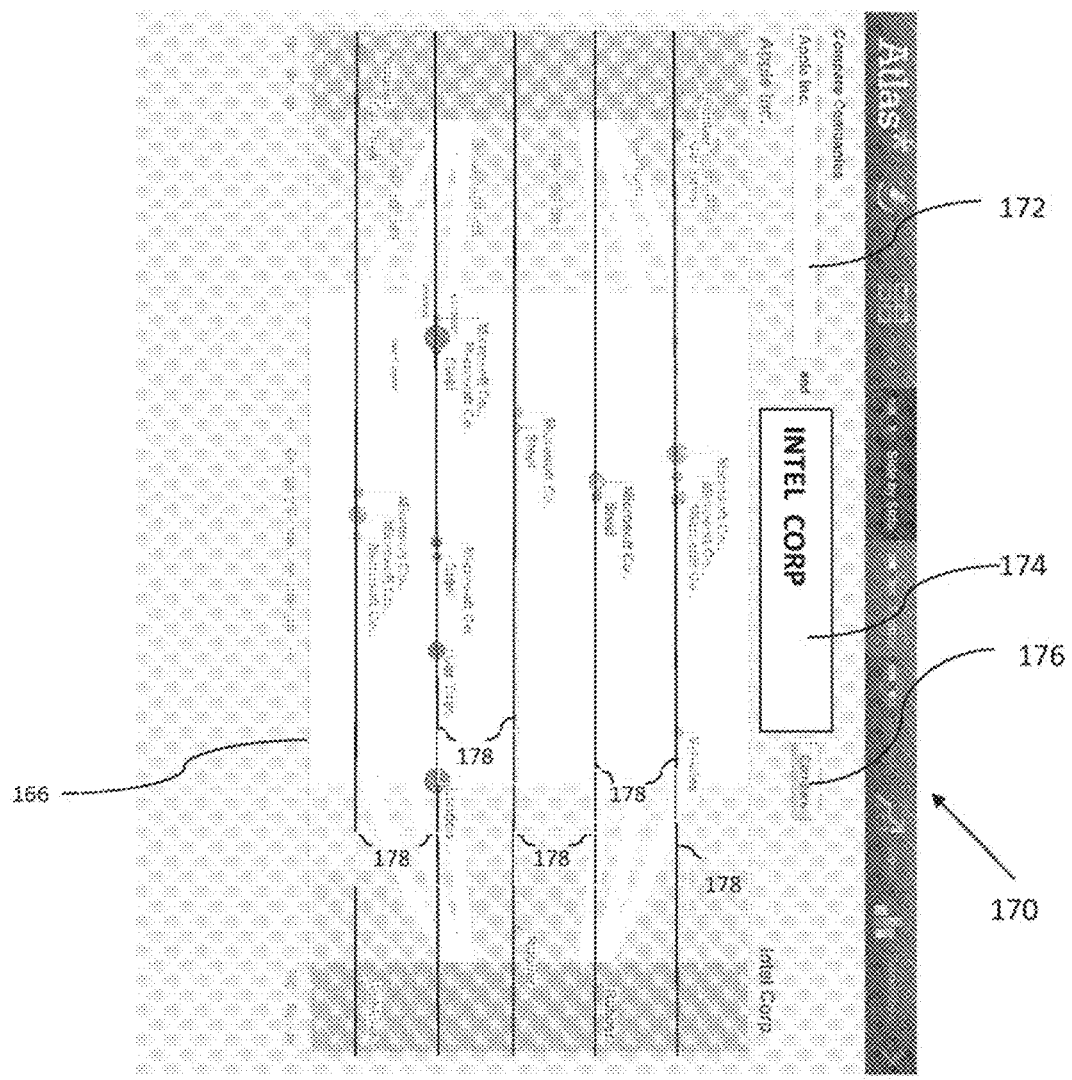
FIG. 13 illustrates an example side-by-side display.

Turning now to FIG. 13, an example side-by-side display 170 showing a first entity identifier 172 ('Apple Inc.') and a second entity identifier 174 ('Intel Corp.') is shown. Upon user selection of a compare button 176, the comparison module 32 Runs a query of the two entities, hereinafter referred to as the 'query entities', and populates the result area 166 with a visual depiction of entity connection strengths between the query entities.

For example, in one embodiment, the result area 166 comprises a number of horizontal lines 178. Each horizontal line 178 represents an entity type, such as but not limited to TRCS sectors, companies, places, commodities, geographies, people, corporate events, and economic indicators, and is populated by the comparison module 32 with a number of entities of the same entity type. In one embodiment, each entity displayed on a horizontal line is represented using a visual indicator, such as a ball.

As shown in the FIG. 13 example, in one embodiment, the query entities operate as 'magnets.' Specifically, if one of the visual indicators representing an entity is primarily related to one of the query entities, the visual indicator is displayed closer to that query entity's side of the result area 166. Entities with the same or similar strength of connections to both entities are displayed toward the middle zone of the result area 166.

The size of the visual indicator may be determined based on the relative importance of the entity to the query entities combined. For example, in one embodiment, referring to the FIG. 13 example, a larger ball depicted in the result area 166 indicates that the entity depicted by the larger ball is of greater importance to the query entities than a ball shown of a smaller dimension.

As shown in the FIG. 13 example, in one embodiment, the visual identifiers are associated with labels that are automatically displayed. In another embodiment, upon user selection of a visual identifier, a label associated with the selected visual identifier is displayed to the user. Further, visual identifiers may be color coded providing different visual aspects of entities being displayed.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system comprising:
   a data store comprising a plurality of entity records corresponding to, respectively, one of a plurality of entities, each of the plurality of entity records having an entity fingerprint comprising at least one assigned attribute;
   a server including a processor and memory operatively coupled to the data store, the memory storing instructions associated with modules for execution by the processor;
   a fingerprint extraction module when executed by the processor adapted to compute an entity fingerprint associated with a particular entity, the entity fingerprint comprising an abstract representation of the particular entity based at least in part on a set of attributes associated with the particular entity;
   an association module when executed by the processor adapted to compute a first significance score representing a first degree of association between a pair of entities from the plurality of entities in a first direction and a second significance score representing a second degree of association between the pair of entities from the plurality of entities in a second direction, the first significance score and second significance score being based at least in part on a determined set of co-occurrences of the two or more entities in a set of documents including unstructured documents;
   an input configured to electronically receive a first request that identifies a first entity from the plurality of entities;
   a comparison module when executed by the processor adapted to compare the entity fingerprint associated with the first entity to each of the entity fingerprints associated with a set of two or more associated entities determined to be associated with the first entity based on a set of calculated significance scores between the first entity and the set of two or more associated entities, the comparison module further adapted to compute a similarity score between the first entity fingerprint and the entity fingerprints of the set of two or more associated entities, the similarity score based at least in part on applying a similarity function to the set of attributes represented by the respective entity fingerprint;
   the comparison module when executed by the processor further adapted to identify at least one similar entity to the first entity from the plurality of entities based on the fingerprint comparisons; and
   the comparison module when executed by the processor further adapted to generate a signal associated with the at least one identified similar entity and the first entity and transmit the signal to an access device, wherein the signal is stored in a non-transitory memory of the access device for use by a user interface.

2. The system of claim 1, wherein the memory stores instructions that, in response to receiving the first request, cause the processor to identify the first entity in response to receiving a unique identifier associated with the first entity.

3. The system of claim 1, wherein the at least one assigned attribute associated with each entity fingerprint is based on a relevancy of the at least one assigned attribute to the associated entity over a particular time interval.

4. The system of claim 3, wherein at least one of the assigned attributes is associated with a weight value indicating a relative importance of the assigned attribute to the associated entity as compared to at least a second assigned attribute assigned to the entity fingerprint, the second assigned attribute assigned by a human expert or external algorithm.

5. The system of claim 1, wherein the memory stores instructions that, in response to receiving the first request, cause the processor to:
   rank a plurality of similar entities in order of similarity to the first entity;
   generate a second signal associated with the ranking; and
   transmit the second signal in response to the second request.

6. The system of claim 1 further comprising a graphical user interface for viewing at least one attribute of the entity fingerprint of the first entity, at least one attribute of the at least one similar entity, at least one document related to the first entity, at least one document related to the first entity and the at least one similar entity, or a combination thereof.

7. The system of claim 1, wherein the memory stores instructions that, in response to receiving a second request, cause the processor to:
   compute a first weighted value for each unique attribute-type associated with the first entity by applying an aggregate function to attribute weights associated with attributes corresponding to each unique attribute-type of the first entity;

compute a second weighted value for each unique attribute-type associated with the at least one similar entity by applying the aggregate function to attribute weights associated with attributes corresponding to each unique attribute type of the similar entity;

normalize the attributes associated with each attribute-type of the first entity using the computed first weighted value;

normalize the attributes associated with each attribute-type of the similar entity using the computed second weighted value; and compute a similarity score by applying a similarity function to the normalized attributes of the first entity and the similar entity.

8. The system of claim 7, wherein the aggregate function is selected from the group consisting essentially of an average function, a minimum function, a maximum function, and the like.

9. The system of claim 7, wherein the similarity function is selected from the group consisting essentially of cosine similarity, Euclidean distance, Manhattan distance, and the like.

10. The system of claim 1, wherein the association module is further adapted to compute significance scores as a weighted average a set of factors including at least two from the set consisting of interestingness, recent interestingness, validation, common neighbors, industry overlap, geographic overlap, temporal significance, and element of surprise.

11. The system of claim 1, wherein each entity fingerprint is used to generate one or more feature vector used in one or more of classification and clustering tasks.

* * * * *